Figure 1:
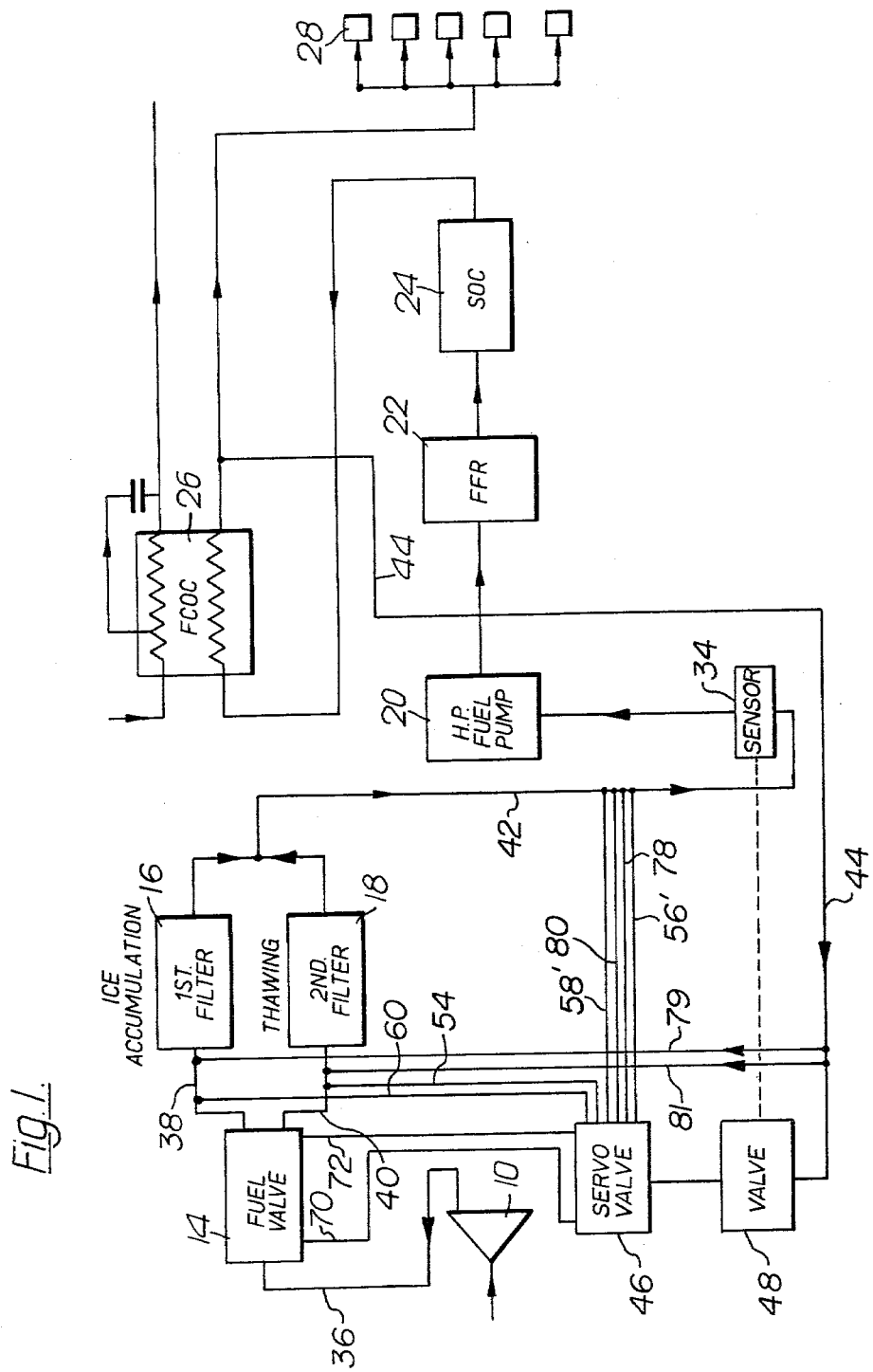

United States Patent [19]

Dodd

[11] 4,201,044
[45] May 6, 1980

[54] FUEL SYSTEMS FOR GAS TURBINE ENGINES

[75] Inventor: Alec G. Dodd, Belper, England

[73] Assignee: Rolls-Royce Limited, London, England

[21] Appl. No.: 888,992

[22] Filed: Mar. 22, 1978

[30] Foreign Application Priority Data

Mar. 31, 1977 [GB] United Kingdom ............... 13599/77

[51] Int. Cl.² .................................................. F02G 3/00
[52] U.S. Cl. ........................ 60/39.09 R; 60/39.09 D; 210/132; 210/186; 210/340
[58] Field of Search ................. 55/314, 350; 210/340, 210/132, 186; 60/39.09 R, 39.09 D

[56] References Cited

U.S. PATENT DOCUMENTS

| | | | |
|---|---|---|---|
| 2,670,082 | 2/1954 | Dunn et al. | 210/132 X |
| 2,729,338 | 1/1956 | Heigl | 210/186 X |
| 3,394,813 | 7/1968 | Phillips et al. | 210/186 X |
| 4,033,870 | 7/1977 | Parquet et al. | 210/340 X |
| 4,073,136 | 2/1978 | Symon | 60/39.09 D |

Primary Examiner—Carlton R. Croyle
Assistant Examiner—Edward Look
Attorney, Agent, or Firm—Cushman, Darby & Cushman

[57] ABSTRACT

A fuel system is provided with two filters between the L.P. pump and the H.P. pump, both of which are used (in parallel) when the temperature of the L.P. fuel is above 0° C. When the temperature of the fuel drops below 0° C., all the L.P. fuel is passed through the first filter, and a small supply of warm H.P. fuel is passed through the second filter. Ice collects in the first filter until a predetermined pressure drop across it causes all the L.P. fuel flow to be switched to the second filter. The first filter is then de-iced by a small supply of warm H.P. fuel. This cycle is repeated continuously while the temperature of the L.P. fuel is below 0° C.

5 Claims, 2 Drawing Figures

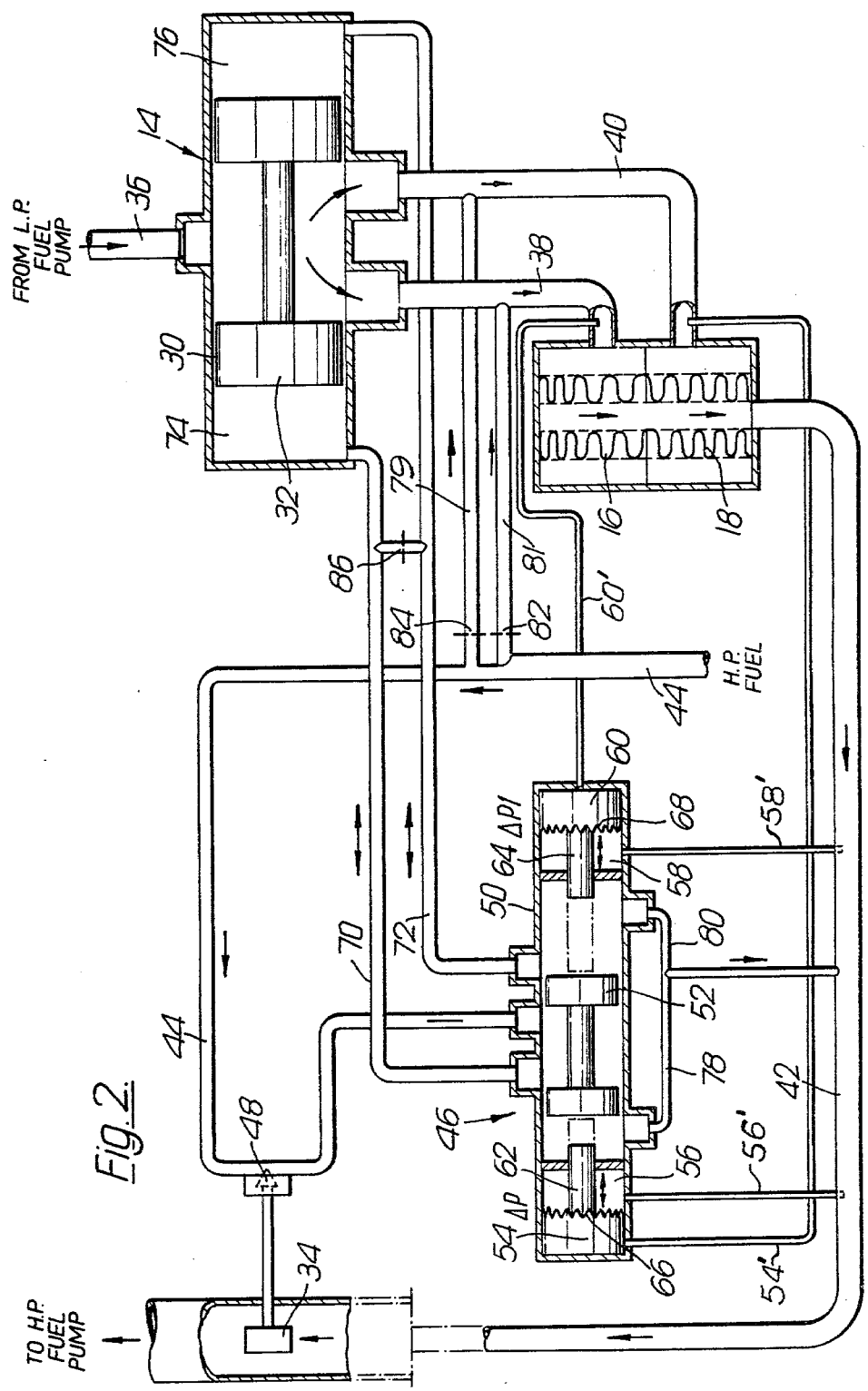

FUEL SYSTEMS FOR GAS TURBINE ENGINES

This invention relates to fuel systems suitable for gas turbine engines and is more particularly concerned with preventing the formation of ice in the fuel system.

A particular problem encountered by aircraft operating in climates where the temperature drops below 0° C. is the formation of ice in the fuel. This is unavoidable since water becomes entrained in the fuel in warmer climates such as by condensation of damp air in the fuel tanks of the aircraft or even in storage tanks on the ground. This water content does not present a problem when the temperature is above freezing point, but below freezing point ice crystals form in the fuel and tend to block fuel filters, particularly at high fuel flow rates such as when the aircraft is taking off, or otherwise using high power and consequently large amounts of fuel.

Various method are used to overcome this problem such as the use of heaters for the fuel, using oil, air or electrical heaters, but these usually tend to be bulky and hence heavy since they must be capable of heating all of the fuel flow to above 0° C. to melt the ice in the fuel.

It is an object of the present invention to provide a fuel system for a gas turbine engine having a fuel de-icing system which is comparatively simple and compact.

According to the present invention a fuel system for a gas turbine engine includes at least two filter means, switching means for diverting the main fuel flow through the fuel system through one of the filter means at a time, the switching means diverting the main flow of fuel to another filter means when a predetermined quantity of ice has accumulated in the filter means in use and means for thawing the accumulated ice in the filter means.

Preferably there are two filter means and preferably the main flow of fuel is passed through both filter means when the fuel temperature is above substantially 0° C. and is passed through only one of the filter means when the fuel temperature is below substantially 0° C.

The switching means preferably comprise a spool valve adapted to pass the main fuel flow and having three positions, a first position in which the main fuel flow is delivered to both filter means, and second and third positions in which the main fuel flow is delivered to one or the other of the two filter means.

The spool valve may be moved in accordance with the temperature of the main fuel flow, the spool valve moving into its second or third positions when the temperature drops below substantially 0° C. and moving into its first position when the temperature is above substantially 0° C.

Preferably the spool valve is moved by a supply of pressurised fuel, the supply of pressurised fuel being delivered to the spool valve when the temperature of the main fuel flow drops below substantially 0° C.

Preferably means for measuring the pressure drop acrosss each filter means is provided, a predetermined pressure drop across the filter means in use causing the spool valve to move from its second to its third position or vice versa.

The means for thawing the accumulated ice may comprise a small supply of hot fuel flow, air flow, or an electrical heater whereby when the main fuel flow is through one filter means, the ice in the other filter means is being thawed by the hot fuel or air flow or the electrical heater.

A servo valve may be provided which is activated by the means for measuring the pressure drop across each filter, the servo valve switching the supply of pressurised fuel to move the spool valve to its appropriate position.

An embodiment of the invention will now be described by way of example only in which:

FIG. 1 is a schematic diagram of the fuel system of a gas turbine engine incorporating the present invention and FIG. 2 is a schematic diagram of a portion of the fuel system shown in FIG. 1.

In FIG. 1 the fuel system consists of a low pressure fuel pump 10 which delivers fuel from a fuel tank (not shown) to first and second filters 16 and 18 respectively via a fuel valve 14. Fuel leaves the filters 16 and 18 and is delivered to a high pressure fuel pump 20 which supplies a fuel flow regulator 22. The fuel then passes to the engine burners 28 via a shut-off cock 24 and a fuel cooled oil cooler 26. The fuel valve 14 and the filters 16 and 18 are shown in more detail in FIG. 2.

The fuel valve 14 consists of a cylinder 30 in which is moveably mounted a spool 32. The spool is shown in its central position which it adopts when the fuel temperature is above 0° C. The temperature of the fuel is measured immediately downstream of the filters 16 and 18 by a temperature sensor 34.

The fuel valve 14 has three positions. In the first position as shown, the fuel from the low pressure pump 10 passes into the valve along a duct 36 and out of the valve 14 along ducts 38 and 40 into the filters 16 and 18 respectively. The outlets of the filters are connected together so that they are in fact arranged in parallel, the filtered fuel passing to a duct 42 which leads to the high pressure pump 20.

Bled from immediately downstream of the fuel cooled oil cooler 26 is a supply of warm high pressure fuel, and this is supplied along a duct 44 to a servo-valve 46. A valve 48 is located in the duct 44 and this valve is actuated by the temperature sensor 34 so that when the fuel temperature in the duct 42 is below 0° C. the valve 48 opens the duct 44, and when the fuel temperature is above 0° C. the valve 48 closes the duct 44. The warm high pressure fuel can only therefore reach the servo valve 46 when the fuel temperature in the duct 42 is below 0° C.

The servo-valve comprises a cylinder 50, and a moveable spool 52. At each end of the cylinder 50 are arranged two chambers 54 and 56 separated by a flexible diaphragm 66, and two chamber 58 and 60 separated by a flexible diaphragm 68. Attached to the flexible diaphragms 66 and 68 are pistons 62 and 64 respectively. The pistons 62 and 64 are adapted to move the spool 52 in accordance with various pressures fed to the chambers 54, 56, 58 and 60, and the spool 52 can at any time be in any position in the cylinder 50 depending on these pressures.

Ducts 70 and 72 connect the servo-valve 46 to spaces 74 and 76 each end of the fuel valve 14, and two further ducts 78 and 80 connect the servo-valve to the duct 42 downstream of the filters 16 and 18. The chambers 56 and 58 are also connected to the duct 42 by ducts 56' and 58', respectively, whilst the chambers 54 and 60 are connected to the ducts 40 and 38 respectively by the ducts 54' and 60'. The diaphragm 66 therefore responds to any pressure drop developing across the filter 18, and the piston 62 moves to the right when the pressure drop increases. Similarly, the piston 64 moves to the left when the pressure drop across the filter increases.

The warm high pressure duct 44 is also connected by ducts 79 and 81 to the ducts 40 and 38 respectively, the ducts 70 and 81 also including restrictors 84 and 82 respectively. Since the ducts 79 and 81 are connected to the duct 44 upstream of the valve 48, it will be seen that there is a continuous small flow of warm high pressure fuel into the filters 16 and 18 when the fuel system is in operation. The ducts 70 and 72 are also connected by a restricted orifice 86.

When the fuel system is operational, and assuming the temperature of the fuel to be above 0° C., the spool 32 adopts the position shown in FIG. 2 and the fuel from the L.P. fuel pump 10 passes through the fuel valve 14 and splits into two substantially equal flows along the ducts 38 and 40 to the filters 16 and 18. The filtered fuel passes into the duct 42 then to the H.P. fuel pump 20. Warm high pressure fuel passes along the duct 44 and along the ducts 78 and 80 to join the main flows of fuel along the ducts 38 and 40. The valve 48 is closed at this time and hence no flow of the fuel occurs through the servo-valve 46.

When the temperature of the fuel drops below 0° C. the temperature sensor 34 operates to open the valve 48, thus permitting the H.P. fuel to flow along the duct 14 into the servo-valve 46. As shown, this fuel flow will pass into the duct 70 leading to the space 74. The space 76 at the other end of the fuel valve is in communication with the duct 42 via the servo-valve 46, and the spool 32 will therefore move to the right until the left-hand land of the spool covers the entry to the duct 38. All the fuel flow from the L.P. fuel pump will now travel along the duct 40, and through the filter 18.

Since the temperature of the fuel at this time is below 0° C., ice will form in the fuel, and this ice will accumulate in the filter 18, gradually blocking it and causing the pressure drop across the filter to increase. The pressures in the fuel upstream and downstream of the filter 18 are communicated to the chambers 54 and 56 respectively, and as the pressure drop increases due to the increasing quantity of ice in the filter 18, the diaphragm 66, and hence the piston 62 will move to the right thus moving the spool 52 to the right.

When a predetermined pressure drop is reached the spool 52 moves far enough to cover the entry to the duct 70 and uncover the entry to the duct 72. The warm H.P. fuel then passes along the duct 72 into the space 76 at the right-hand end of the fuel valve 14. The space 74 is now in direct communication with low pressure fuel in the duct 42 via the servo-valve 46. The spool 32 thus moves to the left until the entry to the duct 40 is covered, and the entry to the duct 38 is uncovered. All the L.P. fuel flow thus now passes through the duct 38 and through the filter 16. The flow of warm H.P. fuel along the ducts 81 and 79 continues unaffected, but the flow along the duct 79 into the duct 40 and the filter 18 is the only flow through the filter 18, and this low flow rate warm fuel is sufficient to thaw the ice which has accumulated in the filter 18.

In the meantime, the ice in the fuel is building up in the filter 16 causing the pressure drop across the filter to increase. As before, this pressure drop is communicated to the chambers 58 and 60 causing the diaphragm 68 and the piston 64 to be urged to the left. At this time, there is substantially no pressure drop across the filter 18 since there is negligible fuel flow, and the piston 62 has returned to its normal position under the spring action of the diaphragm 66. When a predetermined pressure drop is reached across the filter 16, the piston 64 pushes the spool 52 to the left until the duct 70 is again in communication with the duct 44, and the duct 72 is in communication with the duct 42. The spool 32 is then moved back to the right diverting the full L.P. fuel flow along the duct 40 and through the filter 18. The continuous warm flow of H.P. fuel through the filter 16 now thaws the ice which has accumulated in the filter. The thawed ice mixes with the fuel passing along the duct 42 and could freeze again. However, the fuel has been filtered, and it thus passes to the H.P. fuel pump 20 in which a large temperature increase takes place, thus thawing any reformed ice particles.

This process of switching the flow of fuel through the filters 16 and 18 alternately continues whilst the ice accumulates in the filter in use, and only one of the filters is in use whilst the temperature of the fuel is below 0° C.

When the fuel temperature rises above 0° C., the valve 48 closes thus cutting off the supply of H.P. fuel to either the space 74 or the space 76. There will be no ice in either of the filters 16 or 18 and hence the pressure drop across the filters will be at its normal level and the pistons 62 and 64 will be in their normal centralised positions. The spool 52 will be in a position depending on which filter is in use at the time.

With no H.P. fuel entering the spaces 74 or 76, the pressures in the spaces 74 or 76 will equalise through the restrictor 86 to the pressure existing in the duct 42. The spool 32 will thus centralise, permitting the full flow of L.P. fuel to pass through both of the filters 16 and 18.

The formation of ice is greater at higher fuel flows when the engine is operating at high power such as when the aircraft is taking off and climbing in cold ambient conditions. Thus the system will be most active under these circumstances.

The system is particularly compact and hence has a low cost and low weight compared to more conventional heating systems for preventing the formation of ice in the fuel.

I claim:

1. A fuel system having a main fuel flow for a gas turbine engine, said fuel system comprising:
   two filter means;
   a spool valve means for receiving and passing the main fuel flow to said two filter means, said spool valve means having three operating positions, a first operating position in which the main fuel flow is delivered to both said filter means, and second and third operating positions in which the main fuel flow is delivered to only one of said two filter means respectively;
   a supply of pressurized fuel operatively connected to said spool valve means for moving the same to its operating positions;
   a second valve means controlling the supply of pressurized fuel to said spool valve means;
   temperature sensor means for sensing the temperature of fuel downstream of the filter means, said temperature sensor means being connected to means for controlling the flow of pressurized fuel to said second valve means to cause said second valve means to deliver pressurized fuel to said spool valve means to cause said spool valve means to move from said first operating position when fuel temperature is below substantially 0° C.;

pressure sensing means for sensing the inlet fuel pressure to each of said filter means and the outlet fuel pressure from each of said filter means, said pressure sensor means being operatively connected to said second valve means to cause the second valve means to move said spool valve means between said second and third positions when a predetermined quantity of ice has accumulated in the filter means in use;

and means for thawing accumulated ice in said filter means.

2. A fuel system as claimed in claim 1 in which said pressure sensing means measures pressure drop across each said filter means, a predetermined pressure drop across the filter means in use causing said spool valve means to move from said second to said third position or vice versa.

3. A fuel system as claimed in claim 2 comprising a servo valve, said servo valve being activated by said pressure sensing means for measuring the pressure drop across each said filter, said servo valve switching said supply of pressurised fuel to move said spool valve means to its appropriate position.

4. A fuel system as claimed in claim 1 in which said means for thawing said accummulated ice comprises a small supply of hot fuel flow, whereby when the main fuel flow is through one said filter means, said ice in said at least one other filter means is being thawed by said small supply of hot fuel flow.

5. A fuel system as claimed in claim 1 in which said main flow of fuel is passed through both said filter means when the fuel temperature is above substantially 0° C. and is passed through only one of said filter means when said fuel temperature is below substantially 0° C.

* * * * *

UNITED STATES PATENT AND TRADEMARK OFFICE
CERTIFICATE OF CORRECTION

PATENT NO. : 4,201,044
DATED : May 6, 1980
INVENTOR(S) : Alec G. Dodd

It is certified that error appears in the above—identified patent and that said Letters Patent is hereby corrected as shown below:

Please correct Figure 1 of the drawings in the above-entitled U.S. Patent 4,201,044 as follows:

Change "54" to --54'--.

Change "60" to --60'--.

Signed and Sealed this

Twenty-second Day of July 1980

[SEAL]

Attest:

Attesting Officer

SIDNEY A. DIAMOND

Commissioner of Patents and Trademark